United States Patent [19]

Hartman et al.

[11] Patent Number: 5,629,087
[45] Date of Patent: May 13, 1997

[54] WATER ACTIVATED GOLF GRIP TAPE

[75] Inventors: William G. Hartman, Seven Hills; Herbert E. Bowling, Jr., Perry Village; Mary K. Senary-Deley, Chardon, all of Ohio

[73] Assignee: Avery Dennison Corporation, Pasadena, Calif.

[21] Appl. No.: 427,122

[22] Filed: Apr. 24, 1995

Related U.S. Application Data

[63] Continuation of Ser. No. 110,865, Aug. 24, 1993, Pat. No. 5,429,703.

[51] Int. Cl.$^6$ .............................. B32B 7/12; B29C 63/18
[52] U.S. Cl. .................... 428/355 AC; 428/351; 428/41.5; 156/294; 427/208
[58] Field of Search ...................... 428/351, 354, 428/355, 40; 427/207.1, 208, 208.4; 156/294

[56] References Cited

U.S. PATENT DOCUMENTS

| | | | |
|---|---|---|---|
| 3,096,202 | 7/1963 | Groot Von Arx | 428/355 |
| 3,556,835 | 1/1971 | Sorell | 428/355 |
| 3,843,397 | 10/1974 | Olson | 428/355 |
| 4,328,269 | 5/1982 | Korpman | 428/355 |
| 4,505,976 | 3/1985 | Doehnert et al. | 428/355 |
| 4,569,960 | 2/1986 | Blake | 428/355 |
| 5,246,770 | 9/1993 | Bottiglione et al. | 156/276 |
| 5,281,288 | 1/1994 | Murray et al. | 156/294 |
| 5,304,419 | 4/1994 | Shores | 428/351 X |
| 5,429,703 | 7/1995 | Hartman et al. | 428/355 X |

OTHER PUBLICATIONS

"Repaid Idea No. 1 from Golf Day Products: How to Replace Your Own Golf Grips", Golf Digest, Apr., 1976, p. 137, Figures 1–3.

*Primary Examiner*—Daniel Zirker
*Attorney, Agent, or Firm*—Pearne, Gordon, McCoy & Granger

[57] ABSTRACT

A method of adhesively securing first and second members together by sliding movement of the members along an interface where the members are to be joined by an adhesive layer having opposed normally tacky and normally sliding-movement-resistant sides includes the step of applying a liquid to an exposed side of the adhesive side to reduce its tackiness. After sliding assembly of the members, the liquid is transmitted from the side of the adhesive to the interior of the adhesive to enable tack increase at the exposed adhesive side and adhering of the members together. The adhesive includes a moisture absorbing component to enable liquid accumulation at the exposed side and subsequent transmission to the adhesive interior.

19 Claims, 1 Drawing Sheet

WATER ACTIVATED GOLF GRIP TAPE

This is a continuation of application Ser. No. 08/110,865, filed Aug. 24, 1993, now U.S. Pat. No. 5,429,703, dated Jul. 4, 1995.

BACKGROUND OF INVENTION AND RELATED ART

The present invention relates to a method of adhesively securing members together using an aqueous activated adhesive system as described below. The method has particular applicability to the adhesive joining of members that are slidingly assembled with an adhesive layer between the members.

Herein, an aqueous or water activated adhesive system includes an adhesive layer that is wetted with water or a substantially aqueous solution along a surface thereof to facilitate the use of the adhesive in the particular application. Similarly, a solvent activated adhesive system includes an adhesive layer that is wetted with an organic solvent along a surface thereof to facilitate its use. Organic solvents comprise carbon containing compounds such as hydrocarbons.

It is often desirable to adhesively join members that are assembled in surrounding relationship, e.g., one of the members receives at least a portion of the other member in a female and male type assembly, with overlying surfaces of the members having an adhesive joint or layer therebetween. An example of such an assembly is the mounting of a gripping member to another member as in the case of a hand grip to be mounted to a hand manipulated device or article such as a golf club, a tennis racket, a hand tool such as a garden tool or a screw driver etc.

In such assemblies, the surrounding or overlying surfaces may substantially restrict the transmission of fluids, i.e., vapors or liquids, from the adhesive joint or layer so as to prevent or impede the set-up of the adhesive. Solvent activated adhesives have been favored in such applications heretofore since typically a solvent may be more readily transmitted from the adhesive layer in vapor and/or liquid form as compared with an aqueous constituent such as water.

Aqueous activated pressure-sensitive adhesives have not been successfully used in such applications since the adhesives have not set-up within a reasonable time period, e.g. 24 hours. Solvent application has been necessary to achieve reasonable set-up times. For convenience, the invention is particularly described hereinafter with respect to the mounting of a grip to a golf club shaft. Such an application requires a sufficiently high adhesive shear strength to resist the torque loads applied to the grip during use of the club.

It is known to mount a golf club grip to a club shaft using a solvent activated adhesive system in the form of a double sided or coated tape. One surface of the tape is applied to the club shaft and the exposed adhesive surface is wetted with an industrial solvent such as toluene to ease the mounting of the grip over the adhesive. Excess solvent is subsequently dried by evaporation.

It is desirable to avoid the use of such solvent activated adhesive systems in favor of more environmentally friendly aqueous activated adhesive systems which are also safer to use in the manufacturing process. Further, it is generally not desirable to use an adhesive system having different adhesive layers for the shaft and grip since such requires orientation and may require separate activation treatments.

SUMMARY OF THE INVENTION

In accordance with the present invention, a modified pressure-sensitive adhesive is used to secure the members together in an assembly formed by sliding movement of the members along an interface or joint where the members are to be joined by a layer of adhesive having opposed normally tacky sides for adhering the members together. The tackiness of at least one side of the adhesive layer is temporarily suppressed and its lubricity increased to allow the relative movement of the members along the interface. This is accomplished by applying a liquid to such side to provide a surface of sufficient lubricity to allow assembly of the members without disruption of the adhesive. In the absence of the liquid, the adhesive tackiness and friction substantially prevent or even inhibit the sliding movement of the members to the assembled condition.

The adhesive is modified to include a liquid or moisture absorbing component that is substantially homogeneously distributed throughout the adhesive. The moisture absorbing component is typically in the form of particles distributed or dispersed in the polymeric matrix of the adhesive.

The moisture absorbing component initially holds a sufficient amount of the liquid at the surface of the exposed side of the adhesive to suppress tackiness and increase lubricity to allow sliding assembly of the members. Thereafter, the moisture absorbing component transmits the liquid from the surface of the exposed side of the adhesive and into the interior of the adhesive to enable the build-up of surface tackiness and adhesive attachment to the adjacent member. The moisture absorbing component particles are in sufficiently close proximity in the adhesive matrix to allow liquid flow along or through the particles as by capillary action and into the interior region of the adhesive.

The moisture absorbing component swells or expands as it absorbs and transmits liquid into the interior of the adhesive layer to achieve substantially the full adhesion potential with little or no adhesion barring liquid at interfaces. The adhesive is in turn expanded or swollen by the absorbing component and assures tighter contact between the adhesive surfaces and adjacent members. It is also believed that the swelling squeezes liquid from the interfaces between the adhesive and the members. Accordingly, an important aspect of the present invention is the realization that a moisture absorbing component may be used to temporarily retain a sufficient amount of liquid at the adhesive surface to suppress adhesion tackiness or detackify the surface, increase surface lubricity and thereby enable sliding assembly of the components. In the absence of the moisture absorbing component, the liquid does not sufficiently detackify and/or lubricate the adhesive surface to allow assembly of the members.

The moisture absorbing component should be effective at relatively low concentrations in the adhesive to achieve liquid absorption sufficient to cause adhesive surface detackification and increased lubricity substantially immediately following a relatively short wetting period in the order of seconds. Preferably, the moisture absorbing component should cause the adhesive to absorb at least about 3% by weight of the liquid or water in a relatively short time period. For example, absorption of about 3% water by weight using a 10 second adhesive immersion period has provided successful results. The upper limit of absorption may range as high as 60% based on a 10 second immersion period.

Further, the inventors recognized that the liquid retained at the surface of the adhesive in the assembled members may be subsequently transmitted into the adhesive interior by the moisture absorbing component to build tackiness and adhesion with the members. Thus, the liquid transmission by the moisture absorbing component overcomes any interfacial effect tending to cause the liquid to be retained at the adhesive surface.

The rate of transmission of the liquid from the adhesive surface is proportional to the rate of liquid or moisture absorption and/or swelling of the absorbing component. By selection of appropriate moisture component absorption and/or swelling rates, a sufficient amount of liquid may be retained at the adhesive surface during an initial time period following assembly to enable the members to be repositioned. Similarly, a suitable adhesive set-up time may be provided for the adhesive.

It has also been found that the liquid transmitted to the interior of the adhesive is adequately retained in the adhesive to achieve a permanent adhesive bond between the members. That is, the liquid does not tend to return or migrate to the adhesive surface in amounts which degrade the adhesion to an unacceptable level. However, it is believed that liquid may be lost from the adhesive at a relatively low rate in accordance with observed weight losses of assembled members. The liquid may be lost through adhesive edges which are not adjacent surfaces of the assembled members.

The liquid or moisture absorbing component comprises a hydrophilic colloidal material such as the so-called superabsorbant polymers that readily absorb water. The absorbing component may be dispersed or emulsified in a liquid medium to facilitate its distribution in the adhesive composition. The dispersed or emulsified absorbing component may be fully miscible with water, and the absorbing component itself may be of low to moderate solubility in water. The absorbing component is characterized by swelling upon absorption of water. Preferred absorbents are acrylic polymers or copolymers dispersed in an organic liquid medium such as mineral oil or aliphatic hydrocarbon to enhance the homogeneous distribution of the absorbing component in the adhesive matrix.

The ease of installation or sliding movement of the member along the detackified surface or side of the adhesive increases with increasing amounts of the absorbing component. If there is too little absorbing component, the members fail to slide to their assembled position. On the other hand, if there is too much absorbing component, the adhesive tends to fail to set-up within a desired time period, e.g. 24 hours, following assembly of the members. The required amount of a particular absorbing component may be readily determined in accordance with the forgoing guides.

The preferred absorbing components herein may be present in amounts ranging from about 1 to about 40% based on the wet weight of the adhesive. More preferably, the absorbing component may be present in amounts ranging from about 5 to about 30%, and most preferably, in amounts ranging from about 10 to about 25% based on the wet weight of the adhesive.

The liquid applied to the adhesive to suppress the tack and increase the lubricity of the adhesive surface may be water or a water solution containing a surface-active agent (surfactant) that reduces surface tension, or which reduces interfacial tension between two liquids, or between a liquid and solid. Surface-active agents include detergents, wetting agents, and emulsifiers.

Water in combination with most commercially available dishwashing detergents or liquids intended for household use have been found to provide satisfactory results. The water to dishwashing detergent weight ratio may range from 10:1 to 100:1. Generally, higher concentrations of dishwashing detergents ease the sliding movement of the members during assembly.

In the case of golf club grip applications, the adhesive may be applied in the form of a double sided tape having one side thereof directly adhered to the club shaft. The exposed adhesive side may be wetted with the liquid in any convenient manner prior to sliding the grip onto the club shaft. In such applications, the grip is initially repositionable and thereafter the adhesive sets-up in less than about 24 hours. The retained liquid in such applications is less than one gram and therefore within the tolerances set by golf club manufacturers in respect to weight variations and weight distributions along the club length.

DETAILED DESCRIPTION OF THE DRAWINGS

Figure 1:
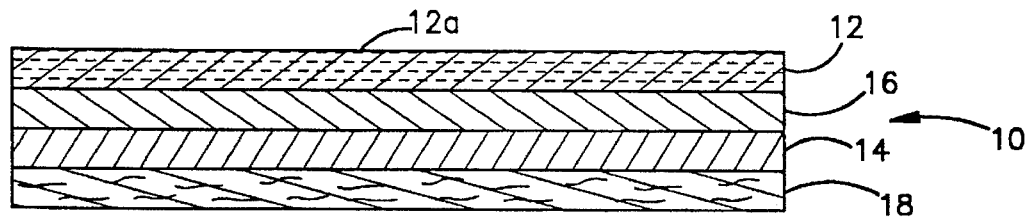
FIG. 1 is a schematic cross-section of a double sided tape having a layer of adhesive in accordance with the invention on each side of a central carrier and a protective liner along at least one of the adhesive layers.

Referring to FIG. 1, a double sided or coated adhesive tape 10 includes a first adhesive layer 12, a second adhesive layer 14 and a central carrier layer 16. The adhesive layers 12 and 14 are preferably of the same adhesive composition in order to avoid an orientation requirement as to tape sides during assembly, but they could be formed of different adhesives. The carrier layer 16 is a saturated paper. The liner 18 is a paper liner having a suitable release coating, e.g. a silicone coating, on each side thereof for permitting clean separation from the adhesive.

The thicknesses of the various layers of the tape 10 are not critical and may vary within typical thickness ranges of commercial tape products. In the tape 10, the adhesive layers 12 and 14 are each about 2 mils thick and weigh about 54 grams/meter$^2$. A suitable saturated paper carrier having a thickness of about 3.5 mils is sold by the W. R. Grace Company under the designation Endura. The liner 18 is a 3.55 mil bleached kraft paper.

The layers 14 and 16 are formed of a pressure-sensitive adhesive having a satisfactory shear strength for the particular application. The pressure-sensitive adhesive is preferably an acrylic based adhesive, but rubber or elastomer based adhesives may also be used. A suitable acrylic based adhesive modified to include a moisture absorbing component in accordance with the invention has the composition reported in the following Table I.

TABLE I

| PERCENT | COMPONENT |
| --- | --- |
| 66.63 | ACRYLIC ADHESIVE BASE RESIN |
| 0.05 | CROSS-LINKER |
| 0.12 | INHIBITOR |

TABLE I-continued

| PERCENT | COMPONENT |
|---------|-----------|
| 13.0 | MOISTURE ABSORBENT[1] |
| 0.7 | BIOCIDE[2] |
| 19.5 | TOLUENE |

[1] An acrylic copolymer (polyacrylic acid: ammonium acrylate: ACM polymer) sold by Allied Colloids Inc. under the designation Alcoprint PTF.
[2] A commercially available biocidal composition effective against mold and fungus, sold by Ferro Corporation under the designation Micro-chek.

The adhesive components are blended using conventional techniques. The moisture absorbing component is added to the blended adhesive components as a dispersion in mineral oil, about 50% solids by weight, and further mixed to achieve a homogeneous mixture with the adhesive constituents.

A first layer of the blended adhesive is coated onto the release liner 18 and oven dried to form adhesive layer 14. The adhesive layer 14 on the liner 18 is laminated to the smooth side of the carrier 16. The adhesive layer 12 is direct coated onto the rough side of the carrier 16. The double coated stock is then heated in an oven to remove the solvent. The adhesive is cured or cross-linked during the solvent removal step. The resulting tape stock may then be wound in a roll.

The tape stock may be slit to any convenient width by the tape manufacturer or a separate film converter, e.g. a 2" width is useful for golf club applications, to form the tape 10. In the resulting tape 10, the moisture absorbent is homogeneously distributed in the adhesive matrix of the layers 12 and 14. The moisture absorbent particles may be visible to the unaided eye.

Figure 2:
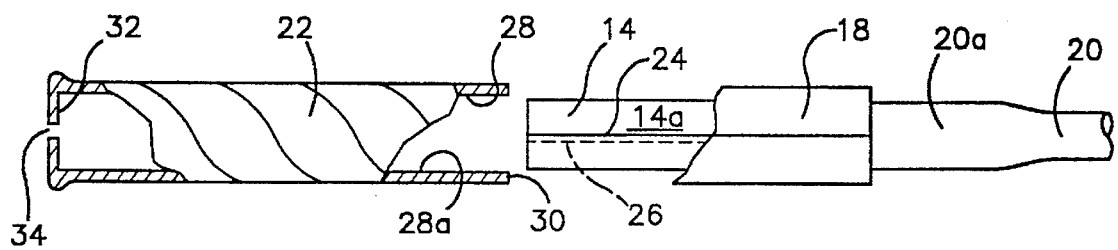
FIG. 2 is a schematic fragmentary elevational view partially in section of a golf club shaft and a grip to be mounted onto the shaft using the tape of FIG. 1 in accordance with the method of the invention.

Referring to FIG. 2, a length of the tape 10 is shown mounted to the upper end of a golf club shaft 20 for attachment of a golf club grip 22. The tape 10 may be applied in a lengthwise direction as shown or it may be spirally wrapped about the shaft 20. In either case, the tape 10 may cover substantially the entire surface area of the shaft 20 which is to be adhesively joined to the grip 22.

For purposes of mounting the tape 10 in the manner shown in FIG. 2, a piece of tape about 2" wide and 10" long is applied in a lengthwise direction along the longitudinal axis of the shaft 20 and the opposite lateral edge portions of the tape are wrapped around the circumference of the shaft. In this manner, a normally tacky exposed side or surface 12a of the adhesive layer 12 is attached to exterior surface 20a of the shaft 20. The tape 10 overhangs the end of the shaft 20 about ⅜", and the overhanging tape portion is folded on itself and tucked into the open end of the shaft 20.

The width of the tape 10 exceeds the circumference of the upper end of the shaft 20 and opposite tape edge portions overlap to form a lapped tape joint. A portion of the liner 18 is broken away in FIG. 2 to expose opposite edges 24 and 26 of the adhesive layer 14 on each side of the lapped tape joint.

The grip 22 includes a longitudinally extending bore 28 having an open proximal end 30 for receiving the taped upper end of the shaft 20 after the liner 18 has been removed. The bore 28 extends to a distal end 32 that communicates with a vent hole 34. The bore 28 has a substantially cylindrical sidewall or surface 28a.

The bore 28 is sized to receive the taped shaft 20 in a tight fit with the bore surface 28a sliding along exposed adhesive surface 14a following the removal of the liner 18. The adhesive surface 14a is normally tacky, and it will resist or prevent the sliding assembly of the grip 22 over the taped end of the shaft 20. The tackiness of the surface 14a is reduced and its lubricity increased by application of a liquid such as water or a water solution containing a surfactant as noted above.

A solution of water and household dishwashing detergent or liquid provides satisfactory results. The water to dishwashing detergent weight ratio may range from 10:1 to 100:1. Generally, higher concentrations of dishwashing detergents ease the sliding movement of the members during assembly. However, if the dishwashing detergent is present in amounts exceeding a 10:1 ratio, the adhesive set-up is substantially delayed or prevented. Typically, a 20:1 ratio has been found to be effective in providing a reasonable period of repositionability of the grip and an acceptable set-up period of 24 hours or less.

The following dishwashing detergents are effective as surfactants in combination with water: Joy, Palmolive, Dove, Ajax, Sweetheart, Ivory, and Dawn.

The liquid may be applied by dipping the taped end of the shaft into the liquid for about one second. The tackiness of the exposed tape surface 14a is suppressed and the surface is provided with a lubricity sufficient to enable the grip 22 to be slid over the end of the club shaft 20. The absorbent component is believed to cooperate in maintaining a sufficient amount of liquid at the surface to reduce the tackiness and increase the lubricity thereof.

The grip 22 may be moved or repositioned, as for purposes of aligning or orienting the grip on the shaft, for up to about 5 to 10 minutes after it is first mounted on the shaft. Thereafter, the continued absorption of liquid by the absorbent is believed to transmit sufficient liquid from the surface and into the interior region of the adhesive layer 14 to enable the tackiness of the surface 14a to increase sufficiently to inhibit further movement of the grip 22. Liquid may be transmitted into the layer 16 and the layer 12. It should be appreciated that bulk liquid is wiped from the surface 14a as it is slid into the tightly fitting bore 28.

Figure 3:
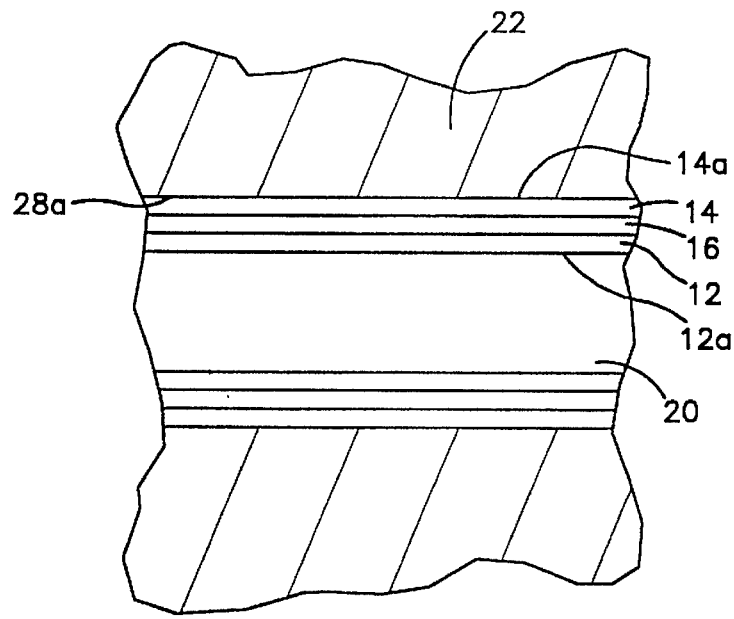
FIG. 3 is a schematic fragmentary elevational view on an enlarged scale and partially in section showing the assembled golf club shaft and grip of FIG. 2.

Referring to FIG. 3, the assembled shaft 20 and grip 22 are shown with the tape 10 substantially enclosed by the surrounding surface 28a of the bore 28. It is believed that substantially no liquid is retained in adhesion inhibiting amounts at the interface between the adhesive surface 14a and the bore surface 28a. The adhesive surface 14a is tightly pressed against the bore surface 28a, and the liquid carried into the bore 28 during the assembly process has been transmitted into the interior region of the adhesive layer 14.

The adhesive layer 14 is believed to be fully set-up after 24 hours following the grip mounting. The sufficiency of the adhesive set-up is tested by manually grabbing the center of the grip with both hands and twisting the grip in opposite directions. If the grip does not move, the adhesive is considered to be fully set-up.

In accordance with the foregoing procedures, the following adhesives and moisture absorbing components were prepared in the formulations indicated below in Table II based on the wet weight of the adhesive.

TABLE II

| Example | Adhesive | Absorbent | Percent Absorbent[5] |
|---|---|---|---|
| 1 | Acrylic[1] | PTF[3] | 16.67 |
| 2 | " | PP6[4] | " |
| 3 | SBS[2] | PTF[3] | " |
| 4 | Acrylic[1] | PP7[6] | " |
| 1C[7] | Acrylic[1] | None | — |

[1]A pressure-sensitive adhesive having an acrylic adhesive base resin.
[2]A pressure-sensitive adhesive having a rubber adhesive base resin of a styrene-butadiene-styrene block copolymer sold by the Shell Chemical Company under the designation Kraton 1101.
[3]An acrylic copolymer (polyacrylic acid: ammonium acrylate: ACM polymer) sold by Allied Colloids Inc. under the designation Alcoprint PTF.
[4]An acrylate copolymer dispersed in a paraffin solvent sold by Allied Colloids Inc. under the designation Collafix PP6.
[5]Based on the wet weight of the adhesive.
[6]An acrylate copolymer similar to Collafix PP6, but of higher molecular weight, sold by Allied Colloids Inc. under the designation Collafix PP7.
[7]Comparative Example 1C includes the same adhesive as Example 1, but contains no absorbent.

The adhesives of Examples 1–4 were tested for peel adhesion, loop tack and shear properties after being laminated to a polyester backing film. The results are reported below in Table III.

TABLE III

| Example Number | Peel Adhesion[1] | Loop Tack[2] | Static Shear[3] |
|---|---|---|---|
| 1 | 1.44 | 0.84 | 150 |
| 2 | 0.13 | 0.10 | 641 |
| 3 | 5.15 | 5.42 | 863 |
| 4 | 0.31[4] | 3.30 | 802 |
| 1C | 4.30 | 4.50 | 3380[5] |

[1](lbs.), 180° Peel adhesion to stainless steel, PSTC-1.
[2](lbs.), PSTC-7, Fasson Test TM-7A.
[3](minutes to failure), ¼ in.$^2$/500 grams, PSTC-7.
[4]Separation occurred between backing film and adhesive layer instead of between adhesive and steel plate.
[5](minutes to failure), ¼ in.$^2$/1000 grams, PSTC-7.

The dispersion of solid particle absorbent components directly into the adhesive composition is believed to impede the uniform distribution of absorbent component, and it is believed to possibly cause particle collection at the adhesive surface so as to result in substantially no tack. Examples of such solid particle absorbent materials include: Pectin by George A. Hormel & Co. of Austin, Minn., CMC (sodium carboxymethylcellulose) by the Aqualon Company of Hopewell, Va., and Salsorb 90F and Alcasorb AB3F both by Allied Colloids Inc. of Suffolk, Va.

The adhesives of Examples 1–4 were used to prepare double coated tapes in accordance with the above described techniques. The tapes were used to mount grips to golf club shafts with water dips of one second for Examples 1, 2 and 4, and 30 seconds for Example 3. The ease of grip assembly was evaluated on a scale of 1 to 10, 10 being the easiest. Examples 1 through 4 were respectively rated as 8, 6, 5 and 7 for ease of assembly. In Example 1, a slippery egg-white like gel was observed at the adhesive surface. In all cases, adhesive set-up was obtained in 24 hours or less. It was not possible to mount the grip to the club shaft using the tape of Comparative Example 1C due to the tack and friction of the exposed adhesive surface.

The weight gain resulting from the liquid treatment was measured for three grips mounted using the adhesive of Example 1. The taped club shafts were dipped in a 20:1 water to Joy brand dishwashing detergent for a period of one second and drained for a period of 30 seconds. The grips were then assembled onto the taped club shafts and weight gain due to the liquid retained by the assembled grip and club shaft was measured. The results are reported below in Table IV.

TABLE IV

| Example Number | Weight Gain Initial (g.) | Weight Gain 18 hours (g.) |
|---|---|---|
| 4 | 0.86 | 0.73 |
| 5 | 0.60 | 0.56 |
| 6 | 0.73 | 0.67 |

In the case of a golf grip application, the amount of liquid retained in the assembled grip and club is less than about 1 gram (0.035 oz.) for an adhesive area of about 120 cm$^2$ (18 in.$^2$).

The absorption of liquid by adhesives containing absorbing components in accordance with the invention was evaluated by measurement of their absorption rates. The above identified absorbing components PP6, PP7 and PTF were tested at concentrations of 9.1% and 16.7% based on the wet weight of the adhesive composition used in Example 1.

The test samples were prepared by uniformly mixing the indicated weight concentrations of absorbing component dispersions into the adhesive and coating the resulting adhesive compositions on release liners for thermal curing for 5 minutes at 250° F. The cured adhesive composition had a weight of 50 grams/meter$^2$. The cured adhesive/liner compositions were then laminated to 0.2 mil thick aluminum foil test carriers and die cut to form 3" by 4" test samples. The foil test carriers had an average weight of 1.0603 grams/12 in.$^2$. The foil test carriers are assumed to absorb no liquid.

The liner was removed from each liner/adhesive/foil laminate to form an adhesive/foil test sample. The test samples were weighed and then fully submerged in room temperature water for the times shown in the following tables. The test samples were removed from the water following their respective immersion periods, and drained in a vertical orientation for 15 seconds. Each sample was then placed on a clean dry towel, foil side down, and the adhesive side was covered with a second clean towel and lightly blotted to remove excess water from both the foil and adhesive surfaces. The samples were then re-weighed to determine the amount of water absorbed. The results are reported below in the following tables.

Control samples of the same adhesive without any absorbing component (i.e. the adhesive composition of Example 1C) were tested at 10 and 240 second immersion periods and found to absorb 0.31% and 0.46% water, respectively. These relatively low values are assumed to indicate no absorption by the adhesive in the absence of the absorbing component.

In the following Table V, Examples PP6-101 through PP6-109 indicate the absorption of water by adhesive compositions containing PP6 at a 9.1% weight concentration (10 parts per hundred of the remaining adhesive components) for the indicated immersion periods.

TABLE V

| EXAMPLE NUMBER | SECONDS DIPPED[1] | ORIGINAL WEIGHT[2] | WETTED WEIGHT[3] | ADHESIVE WEIGHT[4] | PERCENT ADSORB.[5] |
|---|---|---|---|---|---|
| PP6-101 | 10 | 1.4849 | 1.5140 | 0.4249 | 6.85 |
| PP6-102 | 20 | 1.4641 | 1.4800 | 0.4041 | 3.93 |
| PP6-103 | 30 | 1.4659 | 1.4815 | 0.4059 | 3.84 |
| PP6-104 | 40 | 1.4609 | 1.4893 | 0.4009 | 7.08 |
| PP6-105 | 60 | 1.4608 | 1.4963 | 0.4008 | 8.86 |
| PP6-106 | 90 | 1.4531 | 1.4877 | 0.3931 | 8.80 |
| PP6-107 | 120 | 1.4558 | 1.4915 | 0.3958 | 9.02 |
| PP6-108 | 180 | 1.4526 | 1.4954 | 0.3926 | 10.90 |
| PP6-109 | 240 | 1.4595 | 1.4993 | 0.3995 | 9.96 |

[1]Time in seconds sample is submerged in liquid.
[2]Weight in grams of foil and adhesive sample before dipping.
[3]Weight in grams of foil and adhesive sample after dipping.
[4]Weight in grams of adhesive.
[5]Percent of absorbed liquid based on adhesive weight.

In the following Table VI, Examples PP6-281 through PP6-209 indicate the absorption of water by adhesive compositions containing PP6 at a 16.67% weight concentration (20 parts per hundred of the remaining adhesive components) for the indicated immersion periods.

TABLE VI

| EXAMPLE NUMBER | SECONDS DIPPED[1] | ORIGINAL WEIGHT[2] | WETTED WEIGHT[3] | ADHESIVE WEIGHT[4] | PERCENT ADSORB.[5] |
|---|---|---|---|---|---|
| PP6-201 | 10 | 1.4991 | 1.5327 | 0.4391 | 7.65 |
| PP6-202 | 20 | 1.4995 | 1.5323 | 0.4395 | 7.46 |
| PP6-203 | 30 | 1.4987 | 1.5252 | 0.4387 | 6.04 |
| PP6-204 | 40 | 1.4984 | 1.5402 | 0.4384 | 9.53 |
| PP6-205 | 60 | 1.4998 | 1.5376 | 0.4398 | 8.59 |
| PP6-206 | 90 | 1.4982 | 1.5369 | 0.4382 | 8.83 |
| PP6-207 | 120 | 1.4935 | 1.5354 | 0.4335 | 9.67 |
| PP6-208 | 180 | 1.4982 | 1.5435 | 0.4382 | 10.34 |
| PP6-209 | 240 | 1.4923 | 1.5492 | 0.4323 | 13.16 |

[1]Time in seconds sample is submerged in liquid.
[2]Weight in grams of foil and adhesive sample before dipping.
[3]Weight in grams of foil and adhesive sample after dipping.
[4]Weight in grams of adhesive.
[5]Percent of absorbed liquid based on adhesive weight.

Using the same notation as used in Tables V and VI, the absorption of liquid by adhesive compositions containing PP7 and PTF, at 9.1% and 16.67% weight concentrations, is shown by the data in the following Tables VII and VIII for PP7 and Tables IX and X for PTF.

TABLE VII

| EXAMPLE NUMBER | SECONDS DIPPED[1] | ORIGINAL WEIGHT[2] | WETTED WEIGHT[3] | ADHESIVE WEIGHT[4] | PERCENT ADSORB.[5] |
|---|---|---|---|---|---|
| PP7-101 | 10 | 1.4965 | 1.5416 | 0.4365 | 10.33 |
| PP7-102 | 20 | 1.4838 | 1.5057 | 0.4238 | 5.17 |
| PP7-103 | 30 | 1.4987 | 1.5220 | 0.4387 | 5.31 |
| PP7-104 | 40 | 1.4887 | 1.5139 | 0.4287 | 5.88 |
| PP7-105 | 60 | 1.4970 | 1.5278 | 0.4370 | 7.05 |
| PP7-106 | 90 | 1.4931 | 1.5285 | 0.4331 | 8.17 |
| PP7-107 | 120 | 1.4941 | 1.5343 | 0.4341 | 9.26 |
| PP7-108 | 180 | — | — | — | — |
| PP7-109 | 240 | 1.4871 | 1.5308 | 0.4271 | 10.23 |

[1]Time in seconds sample is submerged in liquid.
[2]Weight in grams of foil and adhesive sample before dipping.
[3]Weight in grams of foil and adhesive sample after dipping.
[4]Weight in grams of adhesive.
[5]Percent of absorbed liquid based on adhesive weight.

TABLE VIII

| EXAMPLE NUMBER | SECONDS DIPPED[1] | ORIGINAL WEIGHT[2] | WETTED WEIGHT[3] | ADHESIVE WEIGHT[4] | PERCENT ADSORB.[5] |
|---|---|---|---|---|---|
| PP7-201 | 10 | 1.5156 | 1.5466 | 0.4556 | 6.80 |
| PP7-202 | 20 | 1.4974 | 1.5318 | 0.4374 | 7.86 |
| PP7-203 | 30 | 1.5165 | 1.5502 | 0.4565 | 7.38 |
| PP7-204 | 40 | 1.5011 | 1.5302 | 0.4411 | 6.60 |
| PP7-205 | 60 | 1.5102 | 1.5516 | 0.4502 | 9.20 |
| PP7-206 | 90 | 1.4934 | 1.5339 | 0.4334 | 9.34 |
| PP7-207 | 120 | 1.5057 | 1.5516 | 0.4457 | 10.30 |
| PP7-208 | 180 | 1.4858 | 1.5374 | 0.4258 | 12.12 |
| PP7-209 | 240 | 1.5040 | 1.5598 | 0.4440 | 12.57 |

[1]Time in seconds sample is submerged in liquid.
[2]Weight in grams of foil and adhesive sample before dipping.
[3]Weight in grams of foil and adhesive sample after dipping.
[4]Weight in grams of adhesive.
[5]Percent of absorbed liquid based on adhesive weight.

TABLE IX

| EXAMPLE NUMBER | SECONDS DIPPED[1] | ORIGINAL WEIGHT[2] | WETTED WEIGHT[3] | ADHESIVE WEIGHT[4] | PERCENT ADSORB.[5] |
|---|---|---|---|---|---|
| PTF-101 | 10 | 1.4980 | 1.5388 | 0.4380 | 9.32 |
| PTF-102 | 20 | 1.5062 | 1.5651 | 0.4462 | 13.20 |
| PTF-103 | 30 | 1.4989 | 1.5713 | 0.4389 | 16.50 |
| PTF-104 | 40 | 1.5099 | 1.5802 | 0.4499 | 15.63 |
| PTF-105 | 60 | 1.5019 | 1.6008 | 0.4419 | 22.38 |
| PTF-106 | 90 | 1.5141 | 1.5884 | 0.4541 | 16.36 |
| PTF-107 | 120 | 1.5119 | 1.5821 | 0.4519 | 15.53 |
| PTF-108 | 180 | 1.5025 | 1.5872 | 0.4425 | 19.14 |
| PTF-109 | 240 | 1.5020 | 1.5736 | 0.4420 | 16.20 |

[1]Time in seconds sample is submerged in liquid.
[2]Weight in grams of foil and adhesive sample before dipping.
[3]Weight in grams of foil and adhesive sample after dipping.
[4]Weight in grams of adhesive.
[5]Percent of absorbed liquid based on adhesive weight.

TABLE X

| EXAMPLE NUMBER | SECONDS DIPPED[1] | ORIGINAL WEIGHT[2] | WETTED WEIGHT[3] | ADHESIVE WEIGHT[4] | PERCENT ADSORB.[5] |
|---|---|---|---|---|---|
| PTF-201 | 10 | 1.5360 | 1.8231 | 0.4760 | 60.32 |
| PTF-202 | 20 | 1.5369 | 1.7491 | 0.4769 | 44.50 |
| PTF-203 | 30 | 1.5433 | 1.9505 | 0.4833 | 84.25 |
| PTF-204 | 40 | 1.5375 | 2.3555 | 0.4775 | 171.31 |
| PTF-205 | 60 | 1.5386 | 2.5333 | 0.4786 | 207.84 |
| PTF-206 | 90 | 1.5353 | 2.7142 | 0.4753 | 248.03 |
| PTF-207 | 120 | 1.5382 | 3.0370 | 0.4782 | 313.43 |
| PTF-208 | 180 | 1.5347 | 4.0050 | 0.4747 | 520.39 |
| PTF-209 | 240 | 1.5387 | 4.3206 | 0.4787 | 581.14 |

[1]Time in seconds sample is submerged in liquid.
[2]Weight in grams of foil and adhesive sample before dipping.
[3]Weight in grams of foil and adhesive sample after dipping.
[4]Weight in grams of adhesive.
[5]Percent of absorbed liquid based on adhesive weight.

As indicated, the adhesive composition absorbs at least about 3% liquid by weight, and more typically, about 3% to about 60% by weight based on the weight of the adhesive. The upper limit of absorption is not known, and it may be limited by failure of the adhesive to set-up in a desired time period or an excessive application weight, e.g. a set-up time greater than 24 hours and a weight increase greater than one gram in a golf club grip mounting application.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

We claim:

1. A double coated adhesive tape including a carrier and first and second adhesive layers on opposed sides of the carrier, said first adhesive layer comprising a pressure-sensitive adhesive including an acrylic adhesive base resin and a hydrophilic colloidal material dispersed in said adhesive base resin, said first adhesive layer having a normally tacky surface, said hydrophilic colloidal material cooperating with an applied aqueous liquid to temporarily suppress the tackiness and increase the lubricity of the normally tacky surface to enable sliding contact with a substrate without adherence and subsequently causing the surface to become sufficiently tacky and adhesive to adhere said tape to said substrate.

2. The tape of claim 1, wherein said hydrophilic colloidal material includes particles distributed in sufficiently close proximity in said adhesive base resin to allow said aqueous liquid to flow along or through said particles.

3. The tape of claim 1, wherein said hydrophilic colloidal material causes said pressure-sensitive adhesive to absorb from about 3% to about 60% by weight of said aqueous liquid based on the weight of said pressure-sensitive adhesive based on a 10 second immersion period in said aqueous liquid.

4. The tape of claim 1, wherein said hydrophilic colloidal material comprises from about 5% to about 30% of said pressure-sensitive adhesive based on wet weight.

5. The tape of claim 1, wherein said hydrophilic colloidal material is a superabsorbent polymer.

6. The tape of claim 5, wherein said superabsorbent polymer causes said pressure-sensitive adhesive to absorb at least 3% by weight of said aqueous liquid based on the weight of said pressure-sensitive adhesive, and the tackiness of said normally tacky surface is depressed for from about 5 to about 10 minutes following the application of said aqueous liquid.

7. The tape of claim 1, wherein said hydrophilic colloidal material temporarily suppresses the tackiness for from about 5 to about 10 minutes following the application of said aqueous liquid.

8. The tape of claim 7, wherein said hydrophilic colloidal material temporarily maintains said applied aqueous liquid at said normally tacky surface in an amount sufficient to temporarily suppress the tackiness and increase the lubricity of the normally tacky surface and subsequently removes aqueous liquid from the surface to cause the surface to become sufficiently tacky and adhesive to adhere said tape to said substrate.

9. The tape of claim 8, wherein said hydrophilic colloidal material removes sufficient liquid from said normally tacky surface to substantially achieve maximum bond strength with said substrate in less than about 24 hours after application of said liquid.

10. The tape of claim 9, wherein said first adhesive layer retains less than about 1 gram of said aqueous liquid per 120 cm$^2$ of adhesive layer after drying 24 hours.

11. A double coated adhesive tape for mounting first and second members in contiguous relationship, said tape including a carrier and first and second adhesive layers on opposed sides of the carrier, said first adhesive layer comprising a pressure-sensitive adhesive including an acrylic adhesive base resin and a hydrophilic colloidal material dispersed in said adhesive base resin, said first adhesive layer having a normally tacky surface, said hydrophilic colloidal material temporarily maintaining an applied aqueous liquid at said normally tacky surface in an amount sufficient to suppress the tackiness and increase the lubricity of the surface to allow one of said members to be slid along said normally tacky surface to its contiguous relationship with the other of said members, said hydrophilic colloidal material subsequently removing aqueous liquid from the surface to cause the surface to become sufficiently tacky and adhesive to adhere said tape to said member.

12. The tape of claim 11, wherein said hydrophilic colloidal material includes particles distributed in sufficiently close proximity in said adhesive base resin to allow said aqueous liquid to flow along or through said particles.

13. The tape of claim 11, wherein said hydrophilic colloidal material removes sufficient liquid from said normally tacky surface to substantially achieve maximum bond strength with said member in less than about 24 hours after application of said liquid.

14. The tape of claim 11, wherein said hydrophilic colloidal material is a superabsorbent polymer.

15. The tape of claim 11, wherein said hydrophilic colloidal material means causes said pressure-sensitive adhesive to absorb from about 3% to about 60% by weight of said aqueous liquid based on the weight of said pressure-sensitive adhesive based on a 10 second immersion period in said aqueous liquid.

16. A double coated adhesive tape comprising a laminate including first and second adhesive layers, said first adhesive layer comprising a pressure-sensitive adhesive including an acrylic adhesive base resin and a hydrophilic colloidal material dispersed in said adhesive base resin, said first adhesive layer having a normally tacky surface, said hydrophilic colloidal material cooperating with an applied aqueous liquid to temporarily suppress the tackiness and increase the lubricity of the normally tacky surface to enable sliding contact with a substrate without adherence and subsequently causing the surface to become sufficiently tacky and adhesive to adhere said tape to said substrate.

17. The tape of claim 16, wherein said hydrophilic colloidal material includes particles distributed in sufficiently close proximity in said adhesive base resin to allow said aqueous liquid to flow along or through said particles.

18. The tape of claim 17, wherein said hydrophilic colloidal material is a superabsorbent polymer.

19. The tape of claim 18, wherein said hydrophilic colloidal material removes sufficient liquid from said normally tacky surface to substantially achieve maximum bond strength with said substrate in less than about 24 hours after application of said liquid.

* * * * *